United States Patent Office 3,535,627
Patented Oct. 20, 1970

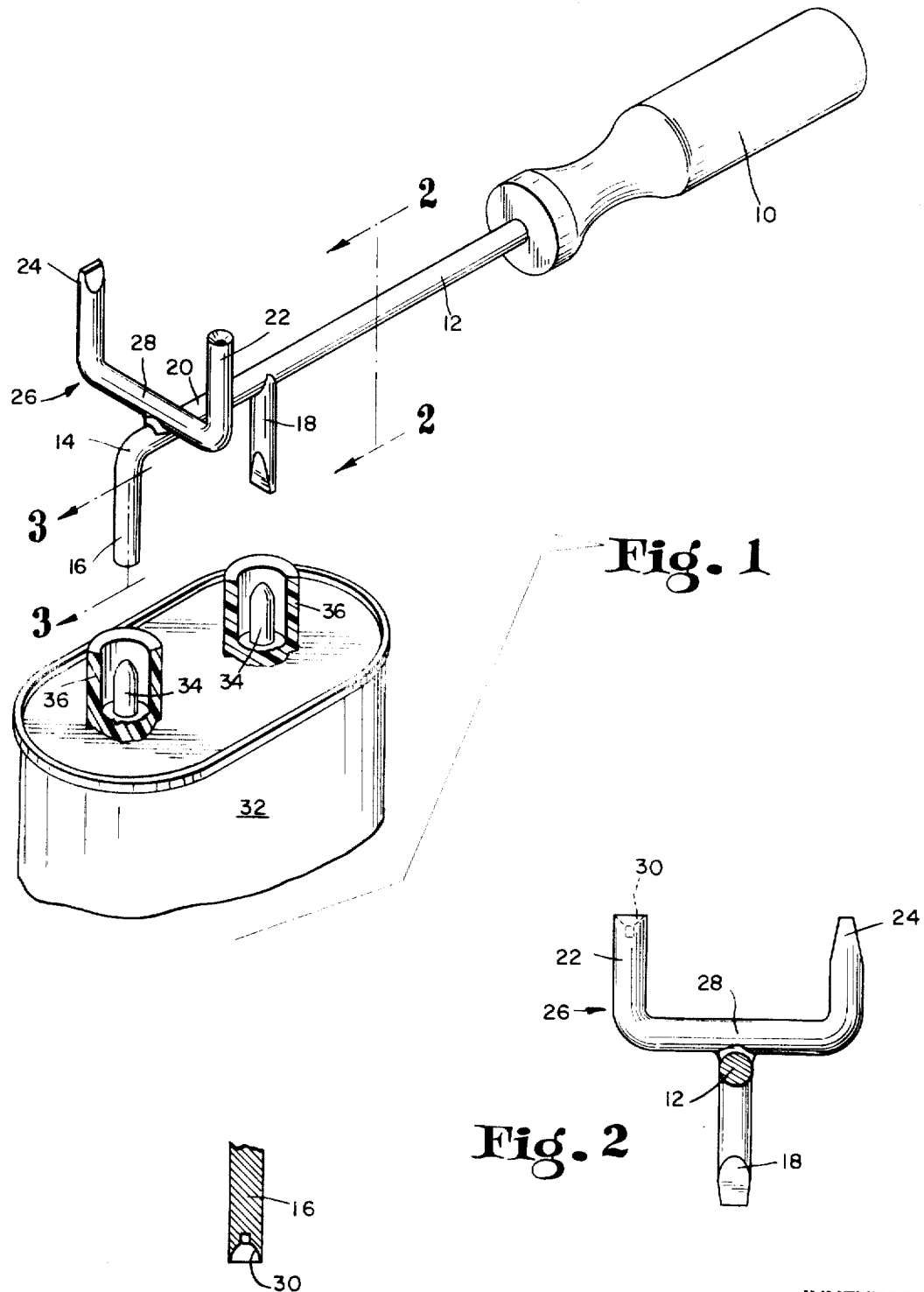

3,535,627
TRANSFORMER TESTING TOOL HAVING A SHAFT WITH A PLURALITY OF EXTENSIONS
George N. Copeland, 322 S. Walnut St., Osgood, Ind. 47037
Filed Aug. 21, 1968, Ser. No. 754,317
Int. Cl. G01r 19/16
U.S. Cl. 324—55                         1 Claim

ABSTRACT OF THE DISCLOSURE

A tool for testing a transformer to determine whether a high potential exists between the recessed terminals of the transformer. A shaft extending from an insulating handle has its tip bent perpendicularly to the shaft, and a short piece of metal is attached to the shaft to form a second tip spaced from the first. The end of the first tip is hollowed out to engage over a recessed terminal of a transformer so that it will not slip out of place as the second tip is moved closer to the other terminal of the transformer. If a spark is drawn as the second tip nears the other terminal of the transformer, then the user will be certain that a high voltage exists across the terminals. A second pair of corresponding tips project in the opposite direction, in a plane at right angles to that of the first pair. The two pairs of tips facilitate testing transformers mounted in different positions.

BACKGROUND OF THE INVENTION

In servicing gun type oil burners it is necessary to check the voltage on the high voltage transformer used to supply power to the electrodes which ignite the fuel oil. Of course, it is necessary to use a meter when an accurate reading is to be taken of the voltage across the transformer; however, if the service man is merely troubleshooting the device, then a quick check can be made by drawing a spark across the terminals. Said terminals are usually recessed in an insulating cup, however, and it is impossible to use a conventional screw driver or similar straight tool to draw a spark. Furthermore, the terminals are not readily accessible and care must be taken that a direct short is not placed across the terminals. Therefore, it is an object of this invention to provide a tool for drawing a spark across the terminals of the transformer while performing such check safely and conveniently.

SUMMARY OF THE INVENTION

In accordance with the invention I provide a tool for testing the terminals of a high voltage transformer to determine whether a high voltage exists at said terminals. The tool comprises a handle formed of insulating material and having a conductive shaft extending therefrom. Two conductive extensions or tips are joined to the shaft in a spaced relation to extend in the same direction and for the same distance for drawing a spark across the transformer terminals. The free end of the outermost tip is hollowed out so that it will fit over one of the transformer terminals, thereby providing a support point for the tool so that it will not slip off said terminal as the other tip is slowly drawn closer to the second terminal, and so that the user may concentrate on the slowly closing distance to prevent the placing of a direct short across the terminals. The extending free ends of the tips permit contact with the terminals even where said terminals are recessed or disposed within the insulating cups. A second pair of tips is desirably provided, extending in an opposite direction and disposed in a plane at right angles to the first pair, for convenience in testing transformers mounted in different positions.

BRIEF DESCRIPTION OF THE DRAWING

The accompanying drawing illustrates the invention. In such drawing:

FIG. 1 is an isometric view of a transformer testing tool embodying my invention;

FIG. 2 is a sectional view taken along the line 2—2 of FIG. 1; and

FIG. 3 is a sectional view taken along the axis of the end tip on the tool of FIG. 1 and showing the hollowed out portion at the end of such tip.

DETAILED DESCRIPTION OF THE PREFERRED EMBODIMENT

A specialized tool embodying my invention for testing transformers, as shown in the drawing, comprises a handle 10 formed of insulating material and having a shaft 12 extending therefrom. A bend 14 near the end of the shaft 12 forms an extension 16 which projects perpendicularly from the shaft 12. A second extension 18 projects perpendicularly from the shaft 12 in the same direction and for the same distance as the extension 16. The shaft 12 and the extensions 16 and 18 are formed of metal and provide a conductive path from the tip of one extension 16 through the interconnecting portion 20 of the shaft 12 to the tip of the other extension 18. A second pair of extensions 22 and 24 are formed from a single piece of conductive shaft 26 bent in two places to provide said extensions which are spaced apart and extend for a distance equal to the corresponding dimensions of the extensions 16 and 18. The second pair of extensions are fastened to the shaft 12 so that their interconnecting portion 28 is perpendicular to said shaft 12.

The tool is useful in testing the high voltage transformers in gun type oil burners. The voltage across the output terminals of such a transformer is coupled to the electrodes which ignite the fuel oil. Such a transformer 32 is shown diagrammatically in FIG. 1. As shown, the terminals 34 are recessed within insulating cups 36 so that they will not be accidentally touched or shorted out by a person servicing the oil burner. Since the terminals are recessed they cannot be tested by drawing a spark with an ordinary screw driver or similar straight tool. However, testing the transformer by drawing a spark across the terminals with some conductive tool is a quick and convenient way of determining that sufficient voltage exists across the terminals. The tool described herein is very useful since the extensions 16 and 18 or 22 and 26 may be placed within the insulating cups to draw a spark across the terminals. That is, one pair of the extensions or the other may be used to draw an arc, regardless of whether the terminals are horizontally or vertically oriented, or whether they are difficult to reach.

As shown in FIG. 3, the tip of the outer extension 16 is hollowed out at 30 to engage over one of the terminals on the transformer, and similarly the tip of the extension 22 is also hollowed out at 30 for this same purpose. In using the device the hollowed portion 30 of one pair of extensions is placed over a first terminal and the other extension of the pair slowly moved toward the second terminal. The hollowed portion of the outer extension holds and locates the device on the terminal so that the tool does not slip away and accidentally short out the terminals. Thus the tool is very effective since the operator may concentrate on slowly moving the inner extension 18 toward the second terminal until a spark is drawn.

Conveniently, the tool may be made from a screw driver having its tip cut off about one inch from the end and brazed to the shaft 12 to form the extension 18. The remaining tip of the screw driver is bent as at 14 so that the resulting extension 16 is also about one inch long. The spacing between the outer and inner extension 18 is determined by the distance between the terminals on a high voltage transformer, said distance generally being about one and one-half inches. The transversely mounted extensions 22 and 26 are attached to the shaft 12 at their interconnection 24 as by brazing.

I claim:

1. A tool for drawing an arc between two high-voltage terminals, comprising a handle having an electrically insulated outer surface, a shaft connected to said handle, a pair of extensions joined to said shaft in spaced relation and extending perpendicularly therefrom, one extension for contacting one of said high-voltage terminals and the other extension for drawing a spark from the other high-voltage terminal, said one extension having its end hollowed out for engaging over the terminal with which it makes contact to hold the tool in said engagement as the other extension is moved slowly toward said other high-voltage terminal, a second pair of extensions attached to said shaft and extending perpendicularly therefrom, said first and second pairs of extensions being for alternative use in association with said terminals, said second pair of extensions being spaced apart along a line perpendicular to said shaft, and one of said extensions of said second pair having its end hollowed out for engaging over one of said terminals.

References Cited

UNITED STATES PATENTS

| | | | |
|---|---|---|---|
| 1,877,041 | 9/1932 | Patterson | 324—54 |
| 2,101,571 | 12/1937 | Breisch | 324—29.5 XR |
| 1,084,932 | 1/1914 | Estes | 324—19 |
| 1,396,454 | 11/1921 | Montilijo | 324—19 |
| 1,638,438 | 8/1927 | Gottschalk. | |
| 2,515,623 | 7/1950 | Williams et al. | 324—51 |
| 2,922,948 | 1/1960 | Washburn | 324—72.5 XR |
| 3,349,322 | 10/1967 | Lowe | 324—29.5 |

OTHER REFERENCES

Pagé, Victor W.: The Model-T Ford Car, New York, Norman W. Henley, 1915, pp. 188–189.

GERARD R. STRECKER, Primary Examiner

U.S. Cl. X.R.

324—72.5, 133, 149